United States Patent [19]

Mah

[11] 4,376,742

[45] Mar. 15, 1983

[54] FUGITIVE LIQUID PHASE DENSIFICATION OF SILICON NITRIDE

[75] Inventor: Tai-Il Mah, Dayton, Ohio

[73] Assignee: Systems Research Laboratories, Inc., Dayton, Ohio

[21] Appl. No.: 237,227

[22] Filed: Feb. 23, 1981

[51] Int. Cl.$^3$ .............................................. C04B 35/58
[52] U.S. Cl. ..................................... 264/85; 264/65; 264/101; 501/97; 501/152
[58] Field of Search ........................ 264/85, 65, 101; 501/97

[56] References Cited

U.S. PATENT DOCUMENTS

| | | | |
|---|---|---|---|
| 3,983,198 | 9/1976 | Mangels | 501/97 |
| 3,989,782 | 11/1976 | Lumby | 264/56 |
| 4,073,845 | 2/1978 | Buljan et al. | 264/65 |
| 4,113,830 | 9/1978 | Mazdiyasni et al. | 264/101 |
| 4,122,140 | 10/1978 | Greskovich et al. | 264/65 |
| 4,134,947 | 1/1979 | Oda et al. | 264/65 |
| 4,143,107 | 3/1979 | Ishii et al. | 264/65 |
| 4,164,528 | 8/1979 | Yajima et al. | 264/65 |
| 4,177,230 | 12/1979 | Mazdiyasni | 264/60 |
| 4,179,486 | 12/1979 | Lange | 264/65 |
| 4,205,033 | 5/1980 | Hattori | 264/65 |
| 4,209,478 | 6/1980 | Wooten et al. | 264/65 |
| 4,264,548 | 4/1981 | Ezis | 264/65 |
| 4,280,973 | 7/1981 | Moskowitz | 264/65 |

OTHER PUBLICATIONS

Mah et al., "The Rule of Cerium Orthosilicate in the Densification of $Si_3N_4$", Journal of the American Ceramic Society, Jan.-Feb. 1979, pp. 12-16.

Mendiraha, "Slow-Crack Growth from Controlled Surface Flaws in Hot-Pressed $Si_3N_4$", Journal of Amer. Ceramic Society, May-Jun. 1977, pp. 226-230.

Priest et al., "Sintering of $Si_3N_4$ Under High Nitrogen Pressure", Journal of the American Ceramic Society, Jan.-Feb. 1977, p. 81.

Guha et al., "Hot-Pressing and Oxidation Behavior of Silicon Nitride with Ceria Additive", Journal of the American Ceramic Society, Jan.-Feb. 1980, pp. 119-120.

Primary Examiner—James H. Derrington
Attorney, Agent, or Firm—Biebel, French and Nauman

[57] ABSTRACT

Dense silicon nitride bodies are fabricated using conventional hot-pressing techniques using cerium oxide as a densification aid. The bodies are then further treated in a flowing inert atmosphere at a temperature of from 1400°-1600° C. for from several hours to 48 hours to remove all or substantially all of the densification aid from grain boundaries. Silicon nitride bodies so treated exhibit superior elevated temperature slow crack growth resistance and strength properties and are suitable for use as structural components in high temperature environments such as jet and internal combustion engines, rockets, atomic power generation, and the like.

5 Claims, No Drawings

FUGITIVE LIQUID PHASE DENSIFICATION OF SILICON NITRIDE

BACKGROUND OF THE INVENTION

This invention relates to a method of fabricating high density silicon nitride bodies, and in particular to a method for removing densification aids from the grain boundaries of the silicon nitride bodies after hot pressing.

Because of scientific advances in fields requiring materials possessing good mechanical properties at high temperatures such as jet and internal combustion engines, rockets, atomic power generation, laser nozzles, and the like, the use of ceramics in the fabrication of structural components has been the subject of intensive research. Silicon nitride ($Si_3N_4$) has been widely used in high temperature applications as a structural material for gas turbine blades and vanes because of its good high temperature strength and creep resistance, low thermal expansion coefficient, and excellent oxidation resistance.

However, because of poor sinterability, it is difficult to obtain a sintered body of silicon nitride having both high density and high mechanical strength. Two major methods have been used in attempting to fabricate silicon nitride structural components. In the first method, the silicon nitride is formed by reaction sintering silicon during a nitriding procedure. This method, however, generally fails to produce the necessary high density required because of porosity which remains in the structure during nitriding.

In the second method, various oxide fluxes or densification aids such as magnesium oxide, yttrium oxide, zirconium oxide, cerium oxide and other rare-earth oxides are added to silicon nitride powder before a hot-pressing procedure in which the silicon nitride body is subjected to heat and pressure in a mold. In such a hot-pressing procedure, bodies having densities approaching the theoretical density of silicon nitride can be fabricated. The oxide densification aids added to the silicon nitride react and produce glassy silicate compositions at grain boundaries. These glassy compositions have deleterious effects on the high temperature creep, slow crack growth, and strength properties of the silicon nitride bodies due to the softening or melting of the glassy compositions when exposed to temperatures of from 1000° to 1200° C., depending upon the particular densification aid used. These properties are important indicators of whether or not a part will fail during high temperature operation. In fact, poor elevated temperature slow crack growth properties of ceramics such as silicon nitride have been a major design barrier in their commercial use.

Consequently, most efforts to improve the high temperature properties of silicon nitride containing oxide densification additives have been directed toward improving the refractory character of the glass phase silicate compositions formed through use of composition control and crystallization methods. For example, Lumby et al, U.S. Pat. No. 3,989,782, teaches the use of a specific ratio of aluminum nitride, aluminum oxide, silicon dioxide, silicon nitride, and a combination of other metal oxides in a hot-pressing procedure which is said to result in the production of a sintered ceramic material (so called, sialon) having improved consistency, strength, and density. Ishii et al, U.S. Pat. No. 4,143,107, disclose a hot-pressing procedure which uses an oxide of a rare earth element and aluminum nitride in an attempt to avoid the formation of glass compositions. The procedure is designed to produce a densified silicon nitride body and to achieve crystallization of those substances which would otherwise produce glassy compositions having lower melting temperatures.

Likewise, Oda et al, U.S. Pat. No. 4,134,947, use specific ratios and weight percentages of beryllium, magnesium, strontium, and rare earth oxides as densification aids in a hot-pressing procedure to avoid the formation of glassy compositions. Finally, Mazdiyasni et al, U.S. Pat. No. 4,113,830, disclose a hot-pressing procedure utilizing rare earth oxides, hydrides, or nitrides which are taught to act both as densification aids and as scavengers for any impurities. These scavenger compounds are said to form, with any impurities, high temperature stable phases without affecting the physical and thermomechanical properties of the silicon nitride body. However, the patentees do acknowledge that under extreme use conditions (i.e., high temperatures) the presence of such compounds may have a deleterious effect on the hot-pressed silicon nitride body.

Accordingly, the need still exists in the art for a method of fabricating dense silicon nitride bodies which have improved elevated temperature slow crack growth and strength properties and which avoids the problems which have plagued the prior art.

SUMMARY OF THE INVENTION

In accordance with the practice of the present invention, silicon nitride powder is thoroughly mixed with a cerium oxide densification aid which is also in powdered form. Thereafter, the mixture is compressed utilizing a conventional hot-pressing procedure at an elevated pressure while being maintained at from 1650° to 1800° C. This compression step is continued for from 30 to 60 minutes or until a compacted article having a density substantially equal to the theoretical density of silicon nitride is obtained. The hot-pressed silicon nitride can be molded, during the compression step, into the shape of a finished part if only simple geometries are involved. Alternatively, the silicon nitride can be formed as a blank which can then be later machined into a finished part.

After the densified silicon nitride body has cooled, it is subjected to a further heat treatment step. In this step, the body is placed in a furnace which is maintained at from 1400°-1600° C. for from several hours to about 48 hours. An inert atmosphere such a nitrogen gas is flowed through the furnace during heat treatment. Alternatively, a vacuum can be used. At the temperatures maintained in the furnace, the cerium oxide and other cerium compounds, such as glassy silicates, which formed at grain boundaries during the initial hot-pressing step, form a fugitive liquid phase. This fugitive phase decomposes and leaves the silicon nitride body during heat treatment.

Silicon nitride bodies treated in this manner are substantially free from cerium compounds and from the glassy phase grain boundary impurities found in prior art hot-pressed silicon nitride. The silicon nitride bodies produced in accordance with the present invention exhibit unexpectedly superior elevated temperature slow crack growth resistance and strength properties when compared with prior conventionally hot-pressed bodies.

Accordingly, it is an object of the present invention to provide a process for producing dense silicon nitride bodies having improved elevated temperature slow crack growth resistance and strength properties by mixing silicon nitride powder with from 1.0 to 2.5% by weight cerium oxide powder, compressing the mixture in an inert atmosphere at a pressure of from 4000–7000 psi at a temperature of from 1650°–1800° C. for a time sufficient to produce a body having a density substantially equal to the theoretical density of silicon nitride, and then further treating the silicon nitride body at a temperature of from 1400°–1600° C. for 4–48 hours. This and other objects and advantages of the invention will be apparent from the following description and the appended claims.

DESCRIPTION OF THE PREFERRED EMBODIMENTS

The powdered silicon nitride and cerium oxide used in the practice of the present invention must be of very high purity, i.e., greater than 99%. Procedures for producing such high purity silicon nitride and cerium oxides are known. See, for example, Mazdiyasni, U.S. Pat. No. 4,113,830. High purity cerium oxides are also readily commercially available.

The amount of cerium oxide added to the silicon nitride as a densification aid is preferably from about 1.0 to 2.5% by weight of the silicon nitride, although somewhat lesser weight amounts may be utilized. It is preferred to use the minimum amount of the cerium oxide needed to obtain a dense silicon nitride body approaching theoretical density during the initial hot-pressing stage while enabling removal of all or substantially all of the cerium compounds during the subsequent heat treatment stage.

The cerium oxide and silicon nitride are thoroughly mixed prior to hot pressing so that they form a homogenous mixture. Suitable mixing appliances include vibrating mixers, ball mills, or the like. However, if only small amounts are used, the compounds can be mixed by shaking a container containing the two by hand. It is important that no impurities be introduced during the mixing step.

The mixture is then placed in a compression zone such as a graphite die or mold. Pressure is applied at from 4000–7000 psi while maintaining the temperature in the compression zone at from between 1650°–1800° C. When carrying out the hot-pressing step, it is preferred that an inert atmosphere such as nitrogen, argon, helium, or the like be present. The mixture is compacted until it approaches the theoretical density of 3.2 gm/cc of silicon nitride. Generally, the application of heat and pressure for from 30–60 minutes is sufficient to accomplish this.

The silicon nitride is then subjected to a further heat treatment to form the fugitive liquid phase for the cerium compounds and to remove all or substantially all traces of cerium from the silicon nitride body. This further heat treatment step is carried out by placing the silicon nitride body in a crucible or boat and covering it over with silicon nitride powder. The crucible or boat is then placed in a furnace maintained at 1400°–1600° for from about four hours to 48 hours. During this time, an inert atmosphere such as nitrogen is flowed through the furnace. Alternatively, a vacuum may be maintained during the heat treating procedure.

The dense silicon nitride body is then cooled and removed from the furnace. It is then ready for further fabrication steps. Surprisingly, silicon nitride bodies treated in accordance with the process of the present invention exhibit superior elevated temperature slow crack growth resistance and strength properties. Since a major disadvantage in the use of ceramics is their brittleness and tendency to catastrophic fracture, and since the two major mechanisms for fracture of ceramic bodies at elevated temperatures are creep and growth of flaws, the slow crack growth rate in a structural part is directly determinative of the total useful life which can be expected from that part. Thus, the superior slow crack growth resistance exhibited by silicon nitride bodies treated in accordance with the present invention are important indicators of the high temperature performance of parts machined or molded from such bodies.

To better understand the practice of the present invention, reference is made to the following nonlimitive example.

EXAMPLE

Four silicon nitride bodies in the form of elongated bars were tested. Samples SNX-3A, SNX-3B, and SNX-3C were prepared by mixing 2.5% by weight cerium dioxide powder with powdered Plessey-Frenchtown silicon nitride. The samples were then hot-pressed in a graphite mold at 1750° C. and 6000 psi for 30 minutes in a nitrogen atmosphere. Samples SNX-3A and SNX-3B were then further treated by packing them in SN-502 silicon nitride powder and placing them in a furnace maintained at 1500° C. for 26 hours in a flowing nitrogen atmosphere. The fourth sample was a commercially available hot-pressed silicon nitride sold under the designation NC-132 from the Norton Co., Worcester, Mass.

A high temperature (1300° C.) slow crack growth study was then performed on all four samples using the controlled indentation flaw technique developed by Mendiratta et al, 61 J.Am. Ceramic Soc. 226–30 (1977). Three controlled microcracks were produced in each of the sample bodies by a 2.6 kg load Knoop indentation and were spaced equidistantly within the constant bending moment zone of four point bend test bars. The bars were then subjected to constant stress at 1300° C. in a vacuum to promote subcritical growth of the microcracks. The results are reported in Table I below.

TABLE I

| Sample Designation and Conditions | Indent Size, 2.6-kg-Load Knoop ($\mu$m) | Applied Stress (kpsi) | Duration of Loading* (hr) | Final Crack Size ($\mu$m) | Growth Rate ($\mu$m/sec) |
| --- | --- | --- | --- | --- | --- |
| SNX-3C As-Hot Pressed | 195 | 20 | 1 | 1200 | 0.279 |
| SNX-3A Heat Treated | 193 | 20 | 1.5 | No Extension | 0 |
| SNX-3B Heat Treated | 198 | 25 | 1 | 390 | 0.053 |
| NC-132 | 185 | 23 | 0.166 | 335 | 0.25 |

TABLE I-continued

| Sample Designation and Conditions | Indent Size, 2.6-kg-Load Knoop (μm) | Applied Stress (kpsi) | Duration of Loading* (hr) | Final Crack Size (μm) | Growth Rate (μm/sec) |
|---|---|---|---|---|---|
| As-Received | | | | | |

*Testing temperature = 1300° C. in vacuum.

As clearly shown, the slow crack growth rate in the samples which were heat treated in accordance with the practice of the present invention is reduced by a factor of 5 as compared to the commercially available sample (NC-132) and to the hot-pressed, but not heat treated, sample (SNX-3C), even at 10–20% higher loads. At the same load, sample SNX-3A showed no slow crack growth while the hot-pressed sample SNX-3C showed an approximately 1000 μm extension in final crack size. Furthermore, since the slow crack growth rate increases exponentially with time, the growth rates of the heat-treated samples would be even less if tested for the same amounts of time as samples SNX-3C and NC-132.

While the methods herein described constitute preferred embodiments of the invention, it is to be understood that the invention is not limited to these precise methods, and that changes may be made without departing from the scope of the invention, which is defined in the appended claims.

What is claimed is:

1. In a method of fabricating a silicon nitride body including the steps of mixing silicon nitride powder with from 1.0 to 2.5% by weight cerium oxide powder and compressing the mixture in an inert atmosphere at a pressure of from 4000–7000 psi and at a temperature of from 1650°–1800° C. for a time sufficient to produce a body having a density substantially equal to the theoretical density of silicon nitride, the improvement comprising:
   further treating said silicon nitride body at a temperature of from 1400°–1600° C. for from 4–48 hours in an insert atmosphere to improve slow crack growth resistance.
2. The method of claim 1 in which said silicon nitride body is covered with silicon nitride powder during the further treating step.
3. The method of claim 1 in which during said further treating step said body is maintained in a flowing inert atmosphere.
4. The method of claim 1 in which said inert atmosphere is nitrogen.
5. The method of claim 1 in which during said further treating step said body is maintained in a vacuum.

* * * * *